United States Patent
Tsunogae

(10) Patent No.: US 11,390,709 B2
(45) Date of Patent: Jul. 19, 2022

(54) LIQUID COPOLYMER FORMED BY RING-OPENING COPOLYMERIZATION OF CYCLOPENTENE, CROSSLINKABLE COMPOSITION, AND CROSSLINKED RUBBER OBJECT

(71) Applicant: ZEON CORPORATION, Tokyo (JP)

(72) Inventor: Yasuo Tsunogae, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 322 days.

(21) Appl. No.: 16/650,188

(22) PCT Filed: Sep. 10, 2018

(86) PCT No.: PCT/JP2018/033411
§ 371 (c)(1),
(2) Date: Mar. 24, 2020

(87) PCT Pub. No.: WO2019/065178
PCT Pub. Date: Apr. 4, 2019

(65) Prior Publication Data
US 2020/0223979 A1    Jul. 16, 2020

(30) Foreign Application Priority Data
Sep. 29, 2017  (JP) .............................. JP2017-190619

(51) Int. Cl.
*C08G 61/08*     (2006.01)
*C08G 18/24*     (2006.01)
*C08G 18/64*     (2006.01)
*C08G 18/76*     (2006.01)

(52) U.S. Cl.
CPC ........... *C08G 61/08* (2013.01); *C08G 18/246* (2013.01); *C08G 18/64* (2013.01); *C08G 18/7664* (2013.01)

(58) Field of Classification Search
CPC ..... C08G 61/08; C08G 18/6204; C08G 18/64
See application file for complete search history.

(56) References Cited

U.S. PATENT DOCUMENTS

| | | | | |
|---|---|---|---|---|
| 4,137,390 A | * | 1/1979 | Ofstead | C08G 61/08 526/143 |
| 5,539,060 A | * | 7/1996 | Tsunogae | C08G 61/08 525/333.1 |
| 6,060,570 A | | 5/2000 | Nubel et al. | |
| 6,143,851 A | | 11/2000 | Nubel et al. | |
| 7,238,405 B2 | * | 7/2007 | Tsunogae | H05K 1/032 525/289 |
| 10,400,060 B2 | * | 9/2019 | Tsunogae | C08G 61/08 |
| 11,072,682 B2 | * | 7/2021 | Okuno | C08G 61/08 |
| 11,267,956 B2 | * | 3/2022 | Tsunogae | C08L 9/06 |
| 2005/0271851 A1 | * | 12/2005 | Shibatou | B32B 27/32 428/40.1 |
| 2009/0187001 A1 | * | 7/2009 | Pawlow | C08G 61/08 528/271 |
| 2009/0306268 A1 | | 12/2009 | Pawlow et al. | |
| 2012/0289646 A1 | * | 11/2012 | Tsunogae | C08K 3/04 526/90 |
| 2013/0281615 A1 | * | 10/2013 | Tsunogae | C08G 61/08 524/588 |
| 2016/0002382 A1 | * | 1/2016 | Tsunogae | C08G 61/08 526/279 |
| 2018/0215865 A1 | * | 8/2018 | Hillmyer | C07C 67/293 |
| 2018/0244837 A1 | * | 8/2018 | Nitadori | C08K 3/36 |
| 2020/0055975 A1 | * | 2/2020 | Tsunogae | C08G 18/62 |

FOREIGN PATENT DOCUMENTS

| | | | |
|---|---|---|---|
| CN | 103224578 A | | 7/2013 |
| JP | H11-514043 A | | 11/1999 |
| JP | 2002220440 A | * | 8/2002 |
| JP | 2009-528434 A | | 8/2009 |
| WO | 2017/051819 A1 | | 3/2017 |
| WO | 2018/079603 A1 | | 5/2018 |

OTHER PUBLICATIONS

May 25, 2021 Search Report issued in European Patent Application No. 18861172.7.
Nov. 20, 2018 International Search Report issued in International Patent Application No. PCT/JP2018/033411.

* cited by examiner

*Primary Examiner* — Michael M Dollinger
(74) *Attorney, Agent, or Firm* — Oliff PLC

(57) ABSTRACT

A liquid cyclopentene ring-opened copolymer includes a monomer unit derived from cyclopentene and a monomer unit derived from a norbornene compound, the monomer unit derived from cyclopentene being present in an amount of 60 to 95 wt %, the liquid cyclopentene ring-opened copolymer having a hydroxyl group-terminated copolymer chain and having a melt viscosity at 25° C. of less than 500 Pa·s, which is measured using a B-type viscometer.

7 Claims, No Drawings

US 11,390,709 B2

LIQUID COPOLYMER FORMED BY RING-OPENING COPOLYMERIZATION OF CYCLOPENTENE, CROSSLINKABLE COMPOSITION, AND CROSSLINKED RUBBER OBJECT

TECHNICAL FIELD

The present invention pertains to a liquid cyclopentene ring-opened copolymer, a cross-linkable composition, and a cross-linked rubber.

BACKGROUND ART

Liquid rubbers having hydroxyl group-terminated polymer chains, such as liquid polybutadiene having hydroxyl groups at both ends, are used as polyol components for polyurethanes. The cross-linking reactions of such rubbers with polyfunctional isocyanates produce products which are widely used in flexible sealant and adhesive applications. Unfortunately, sealants and adhesives produced using liquid polybutadiene having hydroxyl groups at both ends have poor heat resistance and ozone resistance. One strategy that has been examined to overcame the problem is to use a liquid rubber having hydroxyl groups at both ends which is prepared by hydrogenating main-chain double bonds of a liquid polybutadiene having hydroxyl groups at both ends. Such a liquid rubber having hydroxyl groups at both ends, however, cannot be used at low temperature because of its high glass transition temperature and poor flexibility. This problem has created a demand for liquid elastomers which have excellent heat resistance and ozone resistance and can be suitably used even at low temperature.

It is also a known technique to prepare a cyclic olefin ring-opened polymer by ring-opening metathesis polymerization of a cyclic olefin in the presence of a chain transfer agent. For example, in Patent Documents 1 and 2, a relatively low-molecular-weight cyclic olefin ring-opened polymer is prepared by ring-opening polymerization of a cyclic olefin using a ruthenium carbene complex catalyst. More specifically, in Patent Documents 1 and 2, a relatively low-molecular-weight polymer containing a cyclooctadiene monomer unit is prepared by ring-opening polymerization of 1,5-cyclooctadiene using a ruthenium carbene complex catalyst.

RELATED ART DOCUMENTS

Patent Documents

Patent Document 1: Japanese Patent Publication No. JP H11-514043
Patent Document 2: Japanese Patent Publication No. JP 2009-528434

SUMMARY OF THE INVENTION

Problem to be Solved by the Invention

By adding a non-cyclic olefin having a hydroxyl group to the polymerization system, the ring-opening polymerization of 1,5-cyclooctadiene disclosed in Patent Documents 1 and 2 produces a cyclooctadiene ring-opened polymer having a hydroxyl group-terminated polymer main chain. Unfortunately, like the above-mentioned liquid polybutadiene, the resulting cyclooctadiene ring-opened polymer has poor heat resistance and ozone resistance.

Known olefin ring-opened polymers other than cyclooctadiene ring-opened polymers include cyclooctene polymers, cyclopentene polymers, and the like. Unfortunately, because of the reaction mechanism, ring-opening polymerization of cyclooctene or cyclopentene using a ruthenium carbene complex catalyst used in Patent Documents 1 and 2 may result in a ring-opened polymer having a high trans double bond content in repeating units, and its high trans content promotes crystallization at low temperature, resulting in poor handling properties at low temperature. Another problem is that a cross-linked product prepared by reacting the polymer with a reactive compound such as a polyfunctional isocyanate has poor cold resistance (the cross-linked product does not have elasticity at low temperature).

In view of the above issues, the present invention is aimed at providing a liquid cyclopentene ring-opened copolymer which has excellent handling properties at low temperature (e.g., about −30° C.), and provides a cross-linked product which has high tensile strength and has excellent heat resistance, ozone resistance, and cold resistance.

Means for Solving the Problem

As a result of intensive studies to achieve the above purpose, the present inventor has found that the purpose can be achieved by a liquid cyclopentene ring-opened copolymer which has a hydroxyl group-terminated copolymer main chain, contains a specific amount of a monomer unit derived from cyclopentene and a monomer unit derived from a norbornene compound, and has a melt viscosity at 25° C. of less than 500 Pa·s. This finding has led to the completion of the present invention. Specifically, the present inventor has found that such a liquid cyclopentene ring-opened copolymer can maintain the form of a liquid with low viscosity even at low temperature, and a cross-linked product prepared by cross-linking such a liquid cyclopentene ring-opened copolymer with a polyfunctional isocyanate compound has excellent tensile strength, heat resistance, and ozone resistance, and can successfully maintain properties as an elastic body even at low temperature. This finding has led to the completion of the present invention.

Specifically, the present invention provides a liquid cyclopentene ring-opened copolymer comprising a monomer unit derived from cyclopentene and a monomer unit derived from a norbornene compound, the monomer unit derived from cyclopentene being present in an amount of 60 to 95 wt %, the liquid cyclopentene ring-opened copolymer having a hydroxyl group-terminated copolymer chain and having a melt viscosity at 25° C. of less than 500 Pa·s, which is measured using a B-type viscometer.

The liquid cyclopentene ring-opened copolymer according to the present invention preferably has a number average molecular weight (Mn) of 500 to 20,000.

In the liquid cyclopentene ring-opened copolymer according to the present invention, the cis/trans ratio of double bonds in repeating units constituting the copolymer is preferably 10/90 to 40/60.

The liquid cyclopentene ring-opened copolymer according to the present invention preferably has a glass transition temperature (Tg) of −50° C. or lower.

The present invention also provides a method for producing the liquid cyclopentene ring-opened copolymer, comprising performing ring-opening polymerization of monomers including cyclopentene and the norbornene compound in an ether- or ketone-based solvent as a polymerization solvent using a polymerization catalyst containing a ruthenium compound and a hydroxyl group-containing chain transfer agent.

The present invention further provides a cross-linkable composition containing a polyfunctional isocyanate compound in an amount of 1 to 100 parts by weight with respect to 100 parts by weight of the liquid cyclopentene ring-opened copolymer.

The present invention further provides a cross-linked product obtained by cross-linking the cross-linkable composition.

Effects of Invention

The present invention can provide a liquid cyclopentene ring-opened copolymer which has excellent handling properties at low temperature (e.g., about −30° C.), and provides a cross-linked product which has high tensile strength and has excellent heat resistance, ozone resistance, and cold resistance.

DESCRIPTION OF EMBODIMENTS

The liquid cyclopentene ring-opened copolymer according to the present invention is a liquid copolymer which contains a monomer unit derived from cyclopentene and a monomer unit derived from a norbornene compound, contains the monomer unit derived from cyclopentene in an amount of 60 to 95 wt %, and has a hydroxyl group-terminated copolymer chain and a melt viscosity at 25° C. of less than 500 Pa·s, which is measured using a B-type viscometer.

The liquid cyclopentene ring-opened copolymer according to the present invention contains at least monomer unit formed by ring-opening polymerization of cyclopentene and monomer unit formed by ring-opening polymerization of the norbornene compound. The amount of the monomer unit derived from cyclopentene is 60 to 95 wt %, preferably 65 to 92 wt %, more preferably 70 to 90 wt % of the total monomer units. The amount of the monomer unit derived from the norbornene compound is preferably 40 to 5 wt %, more preferably 35 to 8 wt %, further more preferably 30 to 10 wt % of the total monomer units. If the amount of the monomer unit derived from cyclopentene is too small, the liquid cyclopentene ring-opened copolymer cannot be in the liquid state at room temperature, and therefore has poor handling properties not only at room temperature but also at low temperature. Additionally, a cross-linked product prepared by cross-linking the copolymer with a polyfunctional isocyanate compound may not maintain properties as an elastic body at low temperature. On the other hand, an excess amount of the monomer unit derived from cyclopentene promotes crystallization at low temperature, resulting in poor handling properties at low temperature. Additionally, a cross-linked product prepared by cross-linking the copolymer with a polyfunctional isocyanate compound may not maintain properties as an elastic body at low temperature. The cyclopentene and the norbornene compound may or may not have a substituent.

The norbornene compound may be any compound having a norbornene ring. Specific examples thereof include dicyclopentadiene compounds such as dicyclopentadiene, methyl dicyclopentadiene, and dihydrodicyclopentadiene (also known as tricyclo$[5.2.1.0^{2,6}]$deca-8-ene); tetracyclododecene compounds such as tetracyclo$[6.2.1.1^{3,6}.0^{2,7}]$dodeca-4-ene, 9-methyltetracyclo$[6.2.1.1^{3,6}.0^{2,7}]$dodeca-4-ene, 9-ethyltetracyclo$[6.2.1.1^{3,6}.0^{2,7}]$dodeca-4-ene, 9-cyclohexyltetracyclo$[6.2.1.1^{3,6}.0^{2,7}]$dodeca-4-ene, 9-cyclopentyltetracyclo$[6.2.1.1^{3,6}.0^{2,7}]$dodeca-4-ene, 9-methylenetetracyclo$[6.2.1.1^{3,6}.0^{2,7}]$dodeca-4-ene, 9-ethylidenetetracyclo$[6.2.1.1^{3,6}.0^{2,7}]$dodeca-4-ene, 9-vinyltetracyclo$[6.2.1.1^{3,6}.0^{2,7}]$dodeca-4-ene, 9-propenyltetracyclo$[6.2.1.1^{3,6}.0^{2,7}]$dodeca-4-ene, 9-cyclohexenyltetracyclo$[6.2.1.1^{3,6}.0^{2,7}]$dodeca-4-ene, 9-cyclopentenyltetracyclo$[6.2.1.1^{3,6}.0^{2,7}]$dodeca-4-ene, and 9-phenyltetracyclo$[6.2.1.1^{3,6}.0^{2,7}]$dodeca-4-ene; norbornene compounds such as 2-norbornene, 5-methyl-2-norbornene, 5-ethyl-2-norbornene, 5-butyl-2-norbornene, 5-hexyl-2-norbornene, 5-decyl-2-norbornene, 5-cyclohexyl-2-norbornene, 5-cyclopentyl-2-norbornene, 5-ethylidene-2-norbornene, 5-vinyl-2-norbornene, 5-propenyl-2-norborne, 5-cyclohexenyl-2-norbornene, 5-cyclopentenyl-2-norbornene, 5-phenyl-2-norbornene, tetracyclo$[9.2.1.0^{2,10}.0^{3,8}]$tetradeca-3,5,7,12-tetraene (also known as 1,4-methano-1,4,4a,9a-tetrahydro-9H-fluorene), and tetracyclo$[0.2.1.0^{2,10}.0^{4,9}]$pentadeca-4,8,13-tetraene (also known as 1,4-methano-1,4,4a,9,9a,10-hexahydroanthracene); and the like. Among these, preferred are 2-norbornene, dicyclopentadiene, tetracyclo$[9.2.1.0^{2,10}.0^{3,8}]$tetradeca-3,5,7,12-tetraene, and tetracyclo$[6.2.1.1^{3,6}.0^{2,7}]$dodeca-4-ene. One of these norbornene compounds may be used alone, or two or more of them may be used in combination.

The liquid cyclopentene ring-opened copolymer according to the present invention may further contain a monomer unit derived from other monomers copolymerizable with cyclopentene and the norbornene compound. The amount of the monomer unit derived from other monomers copolymerizable with cyclopentene and the norbornene compound is preferably 20 wt % or less, more preferably 10 wt % or less, further more preferably 5 wt % or less, particularly preferably 0 wt % of the total monomer units. Namely, the liquid cyclopentene ring-opened copolymer according to the present invention is particularly preferably a copolymer substantially consisting of only the monomer unit derived from cyclopentene and the monomer unit derived from the norbornene compound. Examples of the other monomers copolymerizable with cyclopentene and the norbornene compound include monocyclic monoolefins having one carbon-carbon double bond in the ring structure other than cyclopentene, such as cyclobutene, cyclohexene, cycloheptene, and cyclooctene; monocyclic dienes having two carbon-carbon double bonds in the ring structure, such as 1,4-cyclohexadiene, 1,4-cycloheptadiene, and 1,5-cyclooctadiene; monocyclic trienes having three carbon-carbon double bonds in the ring structure, such as 1,5,9-cyclododecatriene; and the like. These copolymerizable monomers may or may not have a substituent. One of these copolymerizable monomers may be used alone, or two or more of them may be used in combination.

The liquid cyclopentene ring-opened copolymer according to the present invention is a liquid copolymer or, in other words, a copolymer in the liquid state at ordinary temperature (25° C.) (a copolymer having fluidability at ordinary temperature (25° C.)). The liquid cyclopentene ring-opened copolymer according to the present invention is a copolymer having a melt viscosity of less than 500 Pa·s, preferably 400 Pa's or less, more preferably 300 Pa's or less when measured at 25° C. using a Brookfield viscometer (B-type viscometer). Too high a melt viscosity may result in solidification at low temperature, leading to poor handling properties at low temperature. Additionally, a cross-linked product prepared by cross-linking the copolymer with a polyfunctional isocyanate compound may be a non-elastic resin-like product.

The liquid cyclopentene ring-opened copolymer according to the present invention has a number average molecular weight (Mn) of preferably 500 to 20,000, more preferably 600 to 18,000, further more preferably 700 to 15,000, particularly preferably 700 to 10,000, most preferably 700 to 8,000, which is measured by gel permeation chromatography and is calibrated with polystyrene standards. When the number average molecular weight (Mn) is adjusted within the above ranges, a cross-linked rubber prepared by cross-linking the copolymer with a polyfunctional isocyanate compound has high elasticity and further enhanced tensile strength. The weight average molecular weight (Mw), which is measured by gel permeation chromatography and is calibrated with polystyrene standards, is preferably 1,000 to 50,000, more preferably 1,200 to 45,000, further more preferably 1,400 to 40,000, particularly preferably 1,400 to 20,000, most preferably 1,400 to 16,000.

The ratio (Mw/Mn) between the weight average molecular weight (Mw) and the number average molecular weight (Mn) of the liquid cyclopentene ring-opened copolymer according to the present invention, which are measured by gel permeation chromatography and are calibrated with polystyrene standards, is typically 4.0 or less, preferably 3.5 or less, more preferably 3.0 or less, although not particularly limited thereto. When the Mw/Mn is adjusted within the above range, a cross-linked product prepared by cross-linking the copolymer with a polyfunctional isocyanate compound has further enhanced mechanical strength such as tensile strength.

The cis/trans ratio of double bonds in the repeating units constituting the liquid cyclopentene ring-opened copolymer according to the present invention is within the range of typically 10/90 to 40/60, preferably 10/90 to 30/70, although not particularly limited thereto. The cis/trans ratio can be determined by measuring the liquid cyclopentene ring-opened copolymer according to the present invention by $^{13}$C-NMR spectrometry.

From the viewpoint of obtaining a cross-linked product which has further enhanced properties at low temperature and more suitably maintains properties as an elastic body even at low temperature, the glass transition temperature (Tg) of the liquid cyclopentene ring-opened copolymer according to the present invention is preferably −50° C. or lower, more preferably −60° C. or lower, further more preferably −70° C. or lower. The glass transition temperature of the liquid cyclopentene ring-opened copolymer can be controlled by selecting the type of the norbornene compound to be used and adjusting the amounts of the monomer unit derived from cyclopentene and the monomer unit of the norbornene compound in the copolymer.

The liquid cyclopentene ring-opened copolymer according to the present invention has hydroxyl group(s) as reactive group(s) at the end(s) of the copolymer chain. The copolymer chain may have a hydroxyl group introduced at one end, or may have hydroxyl groups introduced at both ends. Alternatively, these copolymer chains may be present together. In addition to these copolymer chains, a liquid cyclopentene ring-opened copolymer with no hydroxyl group introduced thereto may also be present in the liquid cyclopentene ring-opened copolymer according to the present invention. The hydroxyl groups act as groups reactive with a polyfunctional isocyanate compound during the cross-linking reaction with the polyfunctional isocyanate compound.

From the viewpoint of the reactivity during the cross-linking reaction with the polyfunctional isocyanate compound and the heat resistance of the resulting cross-linked product, the degree of introduction of hydroxyl groups to the ends of the copolymer chain of the liquid cyclopentene ring-opened copolymer according to the present invention, which is expressed as the ratio in percentage of the number of hydroxyl groups to the number of copolymer chains of the liquid cyclopentene ring-opened copolymer, is preferably 80% or more, more preferably 100% or more, further more preferably 120% or more, particularly preferably 190% or more, and may be 200%, although not particularly limited thereto. Any method for determining the degree of introduction of hydroxyl groups to the ends of the copolymer chain can be used without limitation. For example, the degree can be determined from a ratio of a peak area corresponding to hydroxyl groups measured by $^1$H-NMR spectrometry and the number average molecular weight (Mn) determined by gel permeation chromatography.

The liquid cyclopentene ring-opened copolymer according to the present invention can be synthesized by any method without limitation. Examples thereof include ring-opening polymerization of monomers including cyclopentene and the norbornene compound in an ether- or ketone-based solvent as a polymerization solvent using a polymerization catalyst containing a ruthenium compound and a hydroxyl group-containing chain transfer agent; and the like.

The hydroxyl group-containing chain transfer agent is a compound that acts to introduce hydroxyl groups to the ends of the liquid cyclopentene ring-opened copolymer, and also acts as a molecular weight modifier. Preferred hydroxyl group-containing chain transfer agents are hydroxyl group-containing olefin compounds, and examples thereof include allyl alcohol, 3-buten-1-ol, 4-penten-1-ol, 4-hexen-1-ol, 4-hepten-1-ol, 5-decen-1-ol, 5-hexen-1-ol, 5-octen-1-ol, 6-hepten-1-ol, 4-hydroxystyrene, 2-allyl phenol, allyl 4-hydroxybenzoate, 1-cyclohexyl-2-buten-1-ol, ethylene glycol monoallyl ether, 3-allyloxy-1,2-propanediol, 2-butene-1,4-diol, 3-hexene-2,5-diol, 4-octene-1,8-diol, and the like. One of these hydroxyl group-containing chain transfer agents may be used alone, or two or more of them may be used in combination.

The amount of the hydroxyl group-containing chain transfer agent to be used is not particularly limited, and can be determined according to the degree of introduction of hydroxyl groups to the ends of the copolymer chain and the desired number average molecular weight (Mn) of the liquid cyclopentene ring-opened copolymer. The amount is preferably 2 to 50 parts by weight, more preferably 3 to 45 parts by weight, further more preferably 4 to 40 parts by weight with respect to 100 parts by weight of the monomers including cyclopentene and the norbornene compound to be polymerized.

In the synthesis of the liquid cyclopentene ring-opened copolymer according to the present invention, a polymerization catalyst containing a ruthenium compound is used as a polymerization catalyst because such a polymerization catalyst is resistant to the hydroxyl group-containing chain transfer agent and does not generate any insoluble compound. Among polymerization catalysts containing ruthenium compounds, ruthenium carbene complex catalysts are preferable.

Any ruthenium carbene complex that catalyzes the ring-opening polymerization of cyclopentene and the norbornene compound can be used without limitation. Specific examples of ruthenium carbene complexes preferably used include bis(tricyclohexylphosphine)benzylideneruthenium dichloride, bis(triphenylphosphine)-3,3-diphenylpropenylideneruthenium dichloride, dichloro-(3-phenyl-1H-inden-1- ylidene)bis(tricyclohexylphosphine)ruthenium (II), bis(tricyclohexylphosphine) t-butylvinylideneruthenium dichloride, bis(1,3-diisopropylimidazolin-2-ylidene) benzylideneruthenium dichloride, bis(1,3-dicyclohexyl imidazolin-2-ylidene) benzylideneruthenium dichloride, (1,3-dimesitylimidazolin-2-ylidene) (tricyclohexylphosphine) benzylideneruthenium dichloride, (1,3-dimesitylimidazolidin-2-ylidene) (tricyclohexylphosphine) benzylideneruthenium dichloride, bis(tricyclohexylphosphine)ethoxymethylideneruthenium dichloride, (1,3-dimesitylimidazolidin-2-ylidene) (tricyclohexylphosphine) ethoxymethylideneruthenium dichloride, and the like.

The amount of the ruthenium compound to be used as the polymerization catalyst, although not particularly limited, is typically 1:2,000 to 1:2,000,000, preferably 1:5,000 to 1:1,500,000, more preferably 1:10,000 to 1:1,000,000 when expressed as a molar ratio "ruthenium metal in catalyst: monomers including cyclopentene and norbornene compound to be polymerized". The use of too small an amount of the ruthenium compound as the polymerization catalyst may not allow the polymerization reaction to sufficiently proceed. On the other hand, an excess amount thereof may lead to difficulties in removing residual catalyst from the resulting liquid cyclopentene ring-opened copolymer. In this case, a cross-linked product prepared by cross-linking the copolymer with a polyfunctional isocyanate compound may have reduced properties.

Preferred polymerization solvents used in the polymerization reaction are ether- and ketone-based solvents because they successfully dissolve the hydroxyl group-containing chain transfer agent and the polymerization catalyst containing the ruthenium compound. Examples of the ether-based solvents include diethyl ether, cyclopentyl methyl ether, 1,2-dimethoxy ethylene, tetrahydrofuran, and the like. Examples of the ketone-based solvents include acetone, 2-butanone, acetophenone, acetone, methyl isopropyl ketone, methyl n-butyl ketone, methyl isobutyl ketone, methyl amyl ketone, methyl isoamyl ketone, methyl n-hexyl ketone, methyl nonyl ketone, and the like. One of these may be used alone, or two or more of them may be used in combination.

The polymerization temperature is typically set within the range of −50 to 100° C., although not particularly limited thereto. The polymerization reaction time is preferably 1 minute to 72 hours, more preferably 5 hours to 20 hours. Once the polymerization conversion ratio reaches a predetermined value, a known polymerization terminator may be added to the polymerization system to terminate the polymerization reaction.

Through the process described above, a copolymer solution containing the liquid cyclopentene ring-opened copolymer according to the present invention can be prepared. To the liquid cyclopentene ring-opened copolymer thus prepared may be optionally added an antioxidant such as a phenol-based stabilizer, a phosphorus-based stabilizer, or a sulfur-based stabilizer. The amount of the antioxidant to be added can be determined according to factors such as the type thereof. Additionally, an extender oil may also be added if needed. As a method for recovering the liquid cyclopentene ring-opened copolymer from the copolymerization solution, a known recovery method can be used.

<Cross-Linkable Composition>

The cross-linkable composition according to the present invention contains a polyfunctional isocyanate compound in an amount of 1 to 100 parts by weight with respect to 100 parts by weight of the liquid cyclopentene ring-opened copolymer according to the present invention.

The polyfunctional isocyanate compound may be any compound having two or more isocyanate groups without limitation. Examples thereof include aliphatic isocyanate compounds such as hexamethylene diisocyanate and lysine diisocyanate; aromatic isocyanate compounds such as p-phenylene diisocyanate, trilene diisocyanate (TDI), naphtylene diisocyanate (NDI), tolidine diisocyanate (TODI), 4,4'-diphenylmethane diisocyanate (MDI), and polymeric MDI; araliphatic isocyanate compounds such as xylylene diisocyanate (XDI) and tetramethylxylylene diisocyanate; alicyclic isocyanate compounds such as cyclohexyl diisocyanate (CHPI), hydrogenated xylylene diisocyanate (hydrogenated XDI), isophorone diisocyanate (IPDI), and dicyclohexylmethane diisocyanate (HMDI); and the like. One of these polyfunctional isocyanate compounds may be used alone, or two or more of them may be used in combination. Among these, compounds having three or more isocyanate groups are more preferable from the viewpoint of the reactivity with the liquid cyclopentene ring-opened copolymer. Particularly preferred is polymeric MDI.

The amount of the polyfunctional isocyanate compound in the cross-linkable compound according to the present invention is 1 to 100 parts by weight, preferably 5 to 80 parts by weight, more preferably 10 to 60 parts by weight with respect to 100 parts by weight of the liquid cyclopentene ring-opened copolymer. Too small an amount of the polyfunctional isocyanate compound may result in a cross-linked product having poor tensile strength. On the other hand, an excess amount of the polyfunctional isocyanate compound may result in a cross-linked product having poor heat resistance and ozone resistance.

The cross-linkable composition according to the present invention can be prepared by mixing the liquid cyclopentene ring-opened copolymer and the polyfunctional isocyanate compound. As a mixing method, any known method can be used without limitation. The mixing may be performed in a solvent. Examples of usable solvents include, but not particularly limited to, aromatic hydrocarbons such as toluene and xylene; ethers such as tetrahydrofuran and anisole; esters such as ethyl acetate and ethyl benzoate; ketones such as acetone, 2-butanone, and acetophenone; non-protonic polar solvents such as acetonitrile, dimethylformamide, dimethylacetamide, dimethyl sulfoxide, and N-methylpyrrolidone; and the like. One of these solvents may be used alone, or two or more of them may be used in combination.

The cross-linkable composition according to the present invention may contain other components in addition to the liquid cyclopentene copolymer and the polyfunctional isocyanate compound. Examples of the other components include a cross-linking accelerator, a cross-linking activator, a filler, an antioxidant, an activator, a process oil, a plasticizer, a wax, and the like.

Examples of usable cross-linking accelerators include metal catalysts such as organic tin compounds (e.g., dibutyltin dilaurate and dioctyltin dilaurate) and bismuth compounds; base catalysts such as organic amines; urethane reaction catalysts such as DMC catalysts; and the like.

The amount of the cross-linking accelerators added is preferably 0.01 to 10 parts by weight, more preferably 0.02 to 5 parts by weight with respect to 100 parts by weight of the liquid cyclopentene ring-opened copolymer.

<Cross-Linked Product>

The cross-linked product according to the present invention can be obtained by cross-linking the cross-linkable composition according to the present invention, and specifically can be obtained by reacting the terminal hydroxyl groups of the copolymer chain of the liquid cyclopentene copolymer with the isocyanate group of the polyfunctional isocyanate compound.

Any method for cross-linking the cross-linkable composition according to the present invention can be used without limitation. Typically, the cross-linking is performed by heating. In the case of cross-linking by heating, the cross-linking temperature is preferably 40 to 250° C., more preferably 50 to 200° C., although not particularly limited thereto. The cross-linking time is also not particularly limited, and can be determined within the range of 1 minute to 5 hours, for example. As a heating method, press heating, oven heating, steam heating, hot air heating, microwave heating, or the like can be appropriately selected.

As described above, the present invention provides a liquid cyclopentene ring-opened copolymer, a cross-linkable composition containing such a liquid cyclopentene ring-opened copolymer, and a cross-linked product obtained by cross-linking the cross-linkable composition.

In particular, the liquid cyclopentene ring-opened copolymer according to the present invention can maintain the form of a liquid with low viscosity even at low temperature (e.g., about −30° C.), and has excellent handling properties not only at room temperature (25° C.) but also at low temperature.

Since the cross-linkable composition according to the present invention contains the liquid cyclopentene ring-opened copolymer according to the present invention, the cross-linkable composition has excellent fluidability not only at room temperature but also at low temperature, and the cross-linked product thereof has high tensile strength, has excellent heat resistance and ozone resistance, and successfully maintains properties as an elastic body even at low temperature. For this reason, the cross-linkable composition and the cross-linked product according to the present invention can be suitably used in applications where fluidability before cross-linking is required and applications where fluidability before cross-linking is preferred, in particular, applications where fluidability is required even at low temperature and heat resistance and ozone resistance are also required. Additionally, since the cross-linked product according to the present invention can successfully maintain properties as an elastic body not only at room temperature but also at low temperature, the cross-linked product can also be suitably used in applications where elasticity at low temperature is required. Specifically, the cross-linked product can be suitably used as an adhesive, a sealing material, a coating agent, and a paint for use in the building and construction field, the automobile and electronic device field, the air and space field, the food field, and the medicament and medical field, or as an electrically insulating coating material for electric wires and connectors for use in the automobile and electronic device field. In particular, since the cross-linkable composition according to the present invention has excellent fluidability not only at room temperature but also at low temperature, its fluidability enables the cross-linkable composition to be applied to substrates having various shapes. For this reason, the cross-linkable composition can be particularly suitably used in the above applications.

EXAMPLES

The present invention is hereinafter illustrated in greater detail with reference to Examples. However, the present invention should not be construed as limited to these examples. In the following examples, all "part(s)" are on a weight basis unless otherwise indicated. Tests and evaluations were performed according to the following methods.

[Weight Average Molecular Weight (Mw) and Number Average Molecular Weight (Mn) of Liquid Cyclopentene Ring-Opened Copolymer]

The weight average molecular weight (Mw) and the number average molecular weight (Mn) of the liquid cyclopentene ring-opened copolymer were measured with a gel permeation chromatography (GPC) system HLC-8220 (available from TOSOH CORPORATION) including two H-type columns HZ-M (available from TOSOH CORPORATION) connected in series using tetrahydrofuran as a solvent at a column temperature of 40° C. The detector used was a differential refractometer RI-8320 (available from TOSOH CORPORATION). The measured weight average molecular weight (Mw) and number average molecular weight (Mn) of the liquid cyclopentene ring-opened copolymer were values calibrated with polystyrene standards.

[Cis/Trans Ratio of Liquid Cyclopentene Ring-Opened Copolymer]

The cis/trans ratio of the liquid cyclopentene ring-opened copolymer was determined by $^{13}$C-NMR spectrometry.

[Compositional Ratio of Monomer Unit of Liquid Cyclopentene Ring-Opened Copolymer]

The compositional ratio of monomer units of the liquid cyclopentene ring-opened copolymer was determined by $^1$H-NMR spectrometry.

[Glass Transition Temperature (Tg) and Melting Point (Tm) of Liquid Cyclopentene Ring-Opened Copolymer]

The liquid cyclopentene ring-opened copolymer was measured with a differential scanning calorimeter (DSC, product name: "X-DSC 7000, available from Hitachi High-Tech Science Corporation) at a temperature increase rate of 10° C./min from −150° C. to 40° C. Based on the results, the glass transition temperature (Tg) and the melting point (Tm) were determined.

[Degree of Introduction of Hydroxyl Groups to Ends of Copolymer Chain of Liquid Cyclopentene Ring-Opened Copolymer]

The liquid cyclopentene ring-opened copolymer was dissolved in deuterated chloroform, and the deuterated chloroform in which the liquid cyclopentene ring-opened copolymer was dissolved was measured by $^1$H-NMR spectrometry to determine the ratio of the integral of a peak specific to hydroxyl groups and the integral of a peak derived from the olefin. The degree of introduction of hydroxyl groups to the ends of the copolymer chain was calculated based on the ratio between the integrals of the measured peaks and the number average molecular weight (Mn) determined by GPC as described above. The degree of introduction of hydroxyl groups to the ends of the copolymer chain was defined as the ratio of the number of hydroxyl groups to the number of chains of the liquid cyclopentene ring-opened copolymer. Specifically, "degree of introduction of hydroxyl groups=100%" means that one hydroxyl group is introduced per molecule of the liquid cyclopentene ring-opened copolymer chain, and "degree of introduction of hydroxyl groups=200%" means that hydroxyl groups are introduced at both ends of each molecule of the liquid cyclopentene ring-opened copolymer chain.

[Melt Viscosity of Liquid Cyclopentene Ring-Opened Copolymer]

The melt viscosity at 25° C. was measured using a Brookfield viscometer DV-II+Pro (available from AMETEK Brookfield). During the measurement, the shear rate was adjusted within the range of 1.2 to 10 sec$^{-1}$ according to the viscosity.

[Evaluation of Cross-Linked Product as Elastic Body]

Cross-linked sheet products were bent by hand before and after storage in a freezer at −30° C. for one week. A sheet that could be bent 90 degrees or more and returned to the original shape when released was regarded as an elastic body, and a sheet that was too hard to bend by hand or did not return to the original shape when released was regarded as a resin.

[Tensile Strength of Cross-Linked Product]

A dumbbell-shaped test piece in the shape of dumbbell No. 6 was punched out from a cross-linked sheet product in a direction parallel to the grain direction. The dumbbell-shaped test piece was subjected to a tensile test according to JIS K 6251 using a tensile tester (product name TENSC-METER 10K, available from ALPHA TECHNOLOGIES) as a tester at 23° C. and at 500 mn/min to measure the tensile strength $S_0$.

[Percentage Change in Tensile Strength Before and after Heat Treatment of Cross-Linked Product]

A dumbbell-shaped test piece was prepared in the same manner as in the tensile test, and was subjected to a heat treatment in a gear aging oven (product name "AG-1110", available from Ueshima Seisakusho Co., Ltd.) at 100° C. for 72 hours. Thus, a heat-treated test piece was prepared. The heat-treated test piece was subjected to the tensile test in the same manner as above to measure the tensile strength $S_1$ of the heat-treated test piece. From the measurement results, the percentage change $\Delta S$ in tensile strength before and after the heat treatment was determined based on the following formula. A smaller absolute value of the percentage change $\Delta S$, which indicates a smaller change due to the heat treatment, is more preferable.

Percentage change $\Delta S$ (%) in tensile strength before and after heat treatment={(tensile strength $S_1$ (MPa) after heat treatment−tensile strength $S_0$ (MPa) before heat treatment)/tensile strength $S_0$ (MPa) before heat treatment}×100

[Static Ozone Aging Test]

A dumbbell-shaped test piece in the shape of dumbbell No. 1 was punched out from a cross-linked sheet product. The dumbbell-shaped test piece was subjected to a static ozone aging test according to JIS K 6259 using an ozone weather meter (product name "CMS-HN", available from Suga Test Instruments Co., Ltd.) under the following conditions: test temperature of 40° C., ozone concentration of 50 pphm, tensile strain of 20%, and test time of 24 hours. After the ozone aging test, the test piece was evaluated for ozone resistance by observation of the size of cracks according to the crack state observation method of JIS K 6259.

The size of cracks in the test piece was evaluated based on the following criteria.

1: There were no visible cracks but cracks were observed with a 10× magnifying glass.

2: There were visible cracks.

3: There were relatively large and deep cracks (smaller than 1 nm).

4: There were large and deep cracks (1 mm to 3 mm (exclusive))

5: 3 mm or larger cracks were observed or the test piece almost broke off.

Example 1

[Synthesis of Liquid Cyclopentene Ring-Opened Copolymer A Having Hydroxyl Groups at Both Ends and Evaluation of Storage Stability at Low Temperature]

Under a nitrogen atmosphere, 850 parts of cyclopentene, 150 parts of dicyclopentadiene, 70.5 parts of cis-2-butene-1,4-diol, and 990 parts of tetrahydrofuran were placed in a glass vessel containing a stir bar. Subsequently, 0.068 parts of dichloro-(3-phenyl-1H-inden-1-ylidene)bis(tricyclohexylphosphine)ruthenium (II) dissolved in 10 parts of tetrahydrofuran was added thereto to cause the polymerization reaction to proceed for 3 hours at room temperature (25° C.). After the 3-hour polymerization reaction, an excess amount of vinyl ethyl ether was added to terminate the polymerization reaction, and then the copolymer was precipitated with a large amount of methanol. The supernatant was removed to collect the precipitate. After the residual solvent was removed from the collected precipitate in an evaporator, the precipitate was dried under vacuum at 50° C. for 24 hours, thereby yielding 750 parts of a liquid cyclopentene ring-opened copolymer A having hydroxyl groups at both ends. The liquid cyclopentene ring-opened copolymer A thus obtained had an Mn of 4,200 and an Mw of 7,700, contained 86 wt % of a monomer unit derived from cyclopentene and 14 wt % of a monomer unit derived from dicyclopentadiene, and had a degree of introduction of terminal hydroxyl groups of 200%, a cis/trans ratio of 18:82, and a Tg of −81° C. Tm was not observed. The melt viscosity measured at 25° C. was 7 Pa·s.

The liquid cyclopentene ring-opened copolymer A obtained was stored in a freezer at −30° C. for one week, and was taken out after one week. It was found that the liquid cyclopentene ring-opened polymer C maintained the liquid state.

[Preparation of Cross-Linkable Composition and Cross-Linked Product Using Liquid Cyclopentene Ring-Opened Copolymer A Having Hydroxyl Groups at Both Ends]

Next, 12 parts of polymeric MDI (product name "Lupranate M20S", available from BASF INOAC Polyurethanes Ltd.) as a polyfunctional isocyanate compound and 0.05 parts of dibutyltin dilaurate were added with respect to 100 parts of the liquid cyclopentene ring-opened copolymer A prepared above to prepare a cross-linkable composition. The resulting cross-linkable composition was poured into a mold made of a fluororesin (a mold having a 1-mn deep recess), and was cross-linked by heating at 120° C. for 1 hour, thereby providing a 1-mn thick cross-linked sheet product. The resulting cross-linked sheet product was evaluated according to the method described above, and was found to have elasticity. The cross-linked sheet product was measured for tensile strength and percentage change in tensile strength before and after the heat treatment according to the methods described above, and was subjected to the above-described static ozone aging test. The results are shown in Table 2.

Additionally, the cross-linked sheet product was stored in a freezer at −30° C. for one week, and was taken out after one week. It was found that the cross-linked sheet product maintained elasticity.

Example 2

[Synthesis of Liquid Cyclopentene Ring-Opened Copolymer B Having Hydroxyl Groups at Both Ends and Evaluation of Storage Stability at Low Temperature]

440 Parts of a liquid cyclopentene ring-opened copolymer B having hydroxyl groups at both ends was prepared in the same manner as in Example 1 except that the amount of cis-2-butene-1,4-diol used was changed from 70.5 parts to 141 parts, and the same amount of 2-butanone was used as a solvent instead of tetrahydrofuran. The resulting liquid cyclopentene ring-opened copolymer B having hydroxyl groups at both ends had an Mn of 1,900 and an Mw of 3,900, contained 81 wt % of a monomer unit derived from cyclopentene and 19 wt % of a monomer unit derived from dicyclopentadiene, and had a degree of introduction of terminal hydroxyl groups of 200%, a cis/trans ratio of 17:83, and a Tg of −74° C. Tm was not observed. The melt viscosity measured at 25° C. was 2 Pa·s.

The liquid cyclopentene ring-opened copolymer B obtained was stored in a freezer at −30° C. for one week, and was taken out after one week. It was found that the liquid cyclopentene ring-opened polymer B maintained the liquid state.

[Preparation of Cross-Linkable Composition and Cross-Linked Product Using Liquid Cyclopentene Ring-Opened Copolymer B Having Hydroxyl Groups at Both Ends]

Next, a cross-linkable composition and a 1-mn thick cross-linked sheet product were prepared in the same manner as in Example 1 except that 100 parts of the liquid cyclopentene ring-opened copolymer B having hydroxyl groups at both ends was used instead of 100 parts of the liquid cyclopentene ring-opened copolymer A, and were measured and tested in the same manner as in Example 1. The results are shown in Table 2. The cross-linked sheet product obtained had elasticity.

Additionally, the cross-linked sheet product was stored in a freezer at −30° C. for one week, and was taken out after one week. It was found that the cross-linked sheet product maintained elasticity.

Example 3

[Synthesis of Liquid Cyclopentene Ring-Opened Copolymer C Having Hydroxyl Groups at Both Ends and Evaluation of Storage Stability at Low Temperature]

490 Parts of a liquid cyclopentene ring-opened copolymer C having hydroxyl groups at both ends was prepared in the same manner as in Example 1 except that the amount of cyclopentene used was changed from 850 parts to 750 parts, and 250 parts of 2-norbornene and 115.5 parts of 4-octene-1,8-diol were used instead of 150 parts of dicyclopentadiene and 70.5 parts of cis-2-butene-1,4-diol, respectively. The resulting liquid cyclopentene ring-opened copolymer C having hydroxyl groups at both ends had an Mn of 4,900 and an Mw of 13,300, contained 79 wt % of a monomer unit derived from cyclopentene and 21 wt % of a monomer unit derived from 2-norbornene, and had a degree of introduction of terminal hydroxyl groups of 200%, a cis/trans ratio of 17:83, and a Tg of −71° C. Tm was not observed. The melt viscosity measured at 25° C. was 146 Pa·s.

The liquid cyclopentene ring-opened copolymer C obtained was stored in a freezer at −30° C. for one week, and was taken out after one week. It was found that the liquid cyclopentene ring-opened polymer C maintained the liquid state.

[Preparation of Cross-Linkable Composition and Cross-Linked Product Using Liquid Cyclopentene Ring-Opened Copolymer C Having Hydroxyl Groups at Both Ends]

Next, a cross-linkable composition and a 1-mm thick cross-linked sheet product were prepared in the same manner as in Example 1 except that 100 parts of the liquid cyclopentene ring-opened copolymer C having hydroxyl groups at both ends was used instead of 100 parts of the liquid cyclopentene ring-opened copolymer A, and were measured and tested in the same manner as in Example 1. The results are shown in Table 2. The cross-linked sheet product obtained had elasticity.

Additionally, the cross-linked sheet product was stored in a freezer at −30° C. for one week, and was taken out after one week. It was found that the cross-linked sheet product maintained elasticity.

Comparative Example 1

[Synthesis of Liquid Cyclopentene Ring-Opened Polymer D Having Hydroxyl Groups at Both Ends and Evaluation of Storage Stability at Low Temperature]

439 Parts of a liquid cyclopentene ring-opened polymer D having hydroxyl groups at both ends was prepared in the same manner as in Example 1 except that the amount of cyclopentene used was changed from 850 parts to 1000 parts, and dicyclopentadiene was not used. The resulting liquid cyclopentene ring-opened polymer D having hydroxyl groups at both ends had an Mn of 5,000 and an Mw of 7,700, contained 100 wt % of a monomer unit derived from cyclopentene, and had a degree of introduction of terminal hydroxyl groups of 200%, a cis/trans ratio of 18:82, a Tg of −92° C., and a Tm of 23° C. The melt viscosity measured at 25° C. was 9 Pa·s.

The liquid cyclopentene ring-opened polymer D obtained was stored in a freezer at −30° C. for one week, and was taken out after one week. It was found that the liquid cyclopentene ring-opened polymer D had solidified, and could not be removed from the container.

[Preparation of Cross-Linkable Composition and Cross-Linked Product Using Liquid Cyclopentene Ring-Opened Polymer D Having Hydroxyl Groups at Both Ends]

Next, a cross-linkable composition and a 1-mn thick cross-linked sheet product were prepared in the same manner as in Example 1 except that 100 parts of the liquid cyclopentene ring-opened polymer D having hydroxyl groups at both ends was used instead of 100 parts of the liquid cyclopentene ring-opened copolymer A, and were measured and tested in the same manner as in Example 1. The results are shown in Table 2. The cross-linked sheet product obtained had elasticity.

Additionally, the cross-linked sheet product was stored in a freezer at −30° C. for one week, and was taken out after one week. It was found that the cross-linked sheet product had turned into a non-elastic resin-like product.

Comparative Example 2

[Synthesis of Cyclopentene Ring-Opened Copolymer E Having Hydroxyl Groups at Both Ends and Evaluation of Storage Stability at Low Temperature]

489 Parts of a cyclopentene ring-opened copolymer E having hydroxyl groups at both ends was prepared in the same manner as in Example 1 except that the amount of cyclopentene used was changed from 850 parts to 750 parts, 250 parts of 2-norbornene was used instead of 150 parts of dicyclopentadiene, the amount of cis-2-butene-1,4-diol used was changed from 70.5 parts to 14.1 parts, and 0.034 parts of (1,3-dimesitylimidazolidin-2-ylidene) (tricyclohexylphosphine)benzylideneruthenium dichloride was used as a ruthenium compound instead of 0.068 parts of dichloro-(3-phenyl-1H-inden-1-ylidene)bis(tricyclohexylphosphine)ruthenium (II). The resulting cyclopentene ring-opened copolymer E having hydroxyl groups at both ends was in the semi-solid state, had an Mn of 29,500 and an Mw of 66,500, contained 64 wt % of a monomer unit derived from cyclopentene and 36 wt % of a monomer unit derived from 2-norbornene, and had a degree of introduction of terminal hydroxyl groups of 200%, a cis/trans ratio of 22:78, and a Tg of −63° C. Tm was not observed. An attempt to measure the melt viscosity at 25° C. failed because the polymer was too viscous.

The semi-solid cyclopentene ring-opened copolymer E obtained was stored in a freezer at −30° C. for one week, and was taken out after one week. It was found that the cyclopentene ring-opened copolymer E had solidified, and could not be removed from the container.

[Preparation of Cross-Linkable Composition and Cross-Linked Product Using Cyclopentene Ring-Opened Copolymer E Having Hydroxyl Groups at Both Ends]

Next, a cross-linkable composition and a 1-mm thick cross-linked sheet product were prepared in the same manner as in Example 1 except that 100 parts of the semi-solid cyclopentene ring-opened copolymer E having hydroxyl groups at both ends was used instead of 100 parts of the liquid cyclopentene ring-opened copolymer A, and were measured and tested in the same manner as in Example 1. The results are shown in Table 2. The cross-linked sheet product obtained was a non-elastic resin-like product.

Additionally, the cross-linked sheet product was stored in a freezer at −30° C. for one week, and was taken out after one week. It was found that the cross-linked sheet product was a resin-like product, and was easily torn when pulled.

Comparative Example 3

[Synthesis of Cyclopentene Ring-Opened Copolymer F Having Hydroxyl Groups at Both Ends and Evaluation of Storage Stability at Low Temperature]

650 Parts of a cyclopentene ring-opened copolymer F having hydroxyl groups at both ends was prepared in the same manner as in Example 1 except that the amount of cyclopentene used was changed from 850 parts to 500 parts, and the amount of dicylcopentadiene used was changed from 150 parts to 500 parts. The resulting cyclopentene ring-opened copolymer F having hydroxyl groups at both ends was in the semi-solid state, had an Mn of 5, 100 and an Mw of 9,200, contained 44 wt % of a monomer unit derived from cyclopentene and 56 wt % of a monomer unit derived from dicylcopentadiene, and had a degree of introduction of terminal hydroxyl groups of 200%, a cis/trans ratio of 16:84, and a Tg of 15° C. Tm was not observed. An attempt to measure the melt viscosity at 25° C. failed because the polymer was too viscous.

The semi-solid cyclopentene ring-opened polymer F obtained was stored in a freezer at −30° C. for one week, and was taken out after one week. It was found that the cyclopentene ring-opened polymer F had solidified, and could not be removed from the container.

[Preparation of Cross-Linkable Composition and Cross-Linked Product Using Cyclopentene Ring-Opened Copolymer F Having Hydroxyl Groups at Both Ends]

Next, a cross-linkable composition and a 1-mm thick cross-linked sheet product were prepared in the same manner as in Example 1 except that 100 parts of the semi-solid cyclopentene ring-opened copolymer F having hydroxyl groups at both ends was used instead of 100 parts of the liquid cyclopentene ring-opened copolymer A, and were measured and tested in the same manner as in Example 1. The results are shown in Table 2. The cross-linked sheet product obtained was a non-elastic resin-like product.

Additionally, the cross-linked sheet product was stored in a freezer at −30° C. for one week, and was taken out after one week. It was found that the cross-linked sheet product was a non-elastic resin-like product.

Comparative Example 4

[Synthesis of Liquid Cyclopentene Ring-Opened Copolymer G Having Hydroxyl Groups at Both Ends and Evaluation of Storage Stability at Low Temperature]

489 Parts of a liquid cyclopentene ring-opened copolymer G having hydroxyl groups at both ends was prepared in the same manner as in Example 1 except that the amount of cyclopentene used was changed from 850 parts to 700 parts, and 300 parts of 1,5-cyclooctadiene was used instead of 150 parts of dicylcopentadiene. The resulting liquid cyclopentene ring-opened copolymer G having hydroxyl groups at both ends had an Mn of 6,500 and an Mw of 10,100, contained 65 wt % of a monomer unit derived from cyclopentene and 35 wt % of a monomer unit derived from the cyclooctadiene, and had a degree of introduction of terminal hydroxyl groups of 200%, a cis/trans ratio of 37:63, a Tg of −95° C., and a Tm of 18° C. The melt viscosity measured at 25° C. was 12 Pa·s.

The liquid cyclopentene ring-opened polymer G obtained was stored in a freezer at −30° C. for one week, and was taken out after one week. It was found that the liquid cyclopentene ring-opened polymer G had solidified, and could not be removed from the container.

[Preparation of Cross-Linkable Composition and Cross-Linked Product Using Liquid Cyclopentene Ring-Opened Copolymer G Having Hydroxyl Groups at Both Ends]

Next, a cross-linkable composition and a 1-mn thick cross-linked sheet product were prepared in the same manner as in Example 1 except that 100 parts of the liquid cyclopentene ring-opened copolymer G having hydroxyl groups at both ends was used instead of 100 parts of the liquid cyclopentene ring-opened copolymer A, and were measured and tested in the same manner as in Example 1. The results are shown in Table 2. The cross-linked sheet product obtained had elasticity.

Additionally, the cross-linked sheet product was stored in a freezer at −30° C. for one week, and was taken out after one week. It was found that the cross-linked sheet product had turned into a non-elastic resin-like product.

Comparative Example 5

[Synthesis of Liquid Cyclooctadiene Ring-Opened Polymer H Having Hydroxyl Groups at Both Ends and Evaluation of Storage Stability at Low Temperature]

580 Parts of a liquid cyclooctadiene ring-opened polymer H having hydroxyl groups at both ends was prepared in the same manner as in Example 1 except that 1000 parts of 1,5-cyclooctadiene was used instead of 850 parts of cyclopentene, and dicyclopentadiene was not used. The resulting liquid cyclooctadiene ring-opened polymer H having hydroxyl groups at both ends had an Mn of 2,800 and an Mw of 4,900, contained 100 wt % of a monomer unit derived from the cyclooctadiene, and had a degree of introduction of terminal hydroxyl groups of 180%, a cis/trans ratio of 64:36, and a Tg of −104° C. Tm was not observed. The melt viscosity measured at 25° C. was 4 Pa·s.

The liquid cyclooctadiene ring-opened polymer H obtained was stored in a freezer at −30° C. for one week, and was taken out after one week. It was found that the liquid cyclooctadiene ring-opened polymer H maintained the liquid state.

[Preparation of Cross-Linkable Composition and Cross-Linked Product Using Liquid Cyclooctadiene Ring-Opened Polymer H Having Hydroxyl Groups at Both Ends]

Next, a cross-linkable composition and a 1-mm thick cross-linked sheet product were prepared in the same manner as in Example 1 except that 100 parts of the liquid cyclooctadiene ring-opened polymer H having hydroxyl groups at both ends was used instead of 100 parts of the liquid cyclopentene ring-opened copolymer A, and were measured and tested in the same manner as in Example 1. The results are shown in Table 2. The cross-linked sheet product obtained had elasticity.

Additionally, the cross-linked sheet product was stored in a freezer at −30° C. for one week, and was taken out after one week. It was found that the cross-linked sheet product maintained elasticity.

TABLE 1

|  | Polymer | State at ordinary temperature | Molecular weight Mn | Molecular weight Mw | Copolymerized monomer | Amount of cyclopentene monomer units (wt %) |
|---|---|---|---|---|---|---|
| Example 1 | Liquid cyclopentene ring-opened copolymer A | Liquid | 4,200 | 7,700 | Dicyclopentadiene | 86 |
| Example 2 | Liquid cyclopentene ring-opened copolymer B | Liquid | 1,900 | 3,900 | Dicyclopentadiene | 81 |
| Example 3 | Liquid cyclopentene ring-opened copolymer C | Liquid | 4,900 | 13,300 | 2-Norbornene | 79 |
| Comparative Example 1 | Liquid cyclopentene ring-opened polymer D | Liquid | 5,000 | 7,700 | — | 100 |
| Example 2 | Cyclopentene ring-opened copolymer E | Semi-solid | 29,500 | 66,500 | 2-Norbornene | 64 |
| Comparative Example 3 | Cyclopentene ring-opened copolymer F | Semi-solid | 5,100 | 9,200 | Dicyclopentadiene | 44 |
| Comparative Example 4 | Liquid cyclopentene ring-opened copolymer G | Liquid | 6,500 | 10,100 | Dicyclooctadiene | 65 |
| Comparative Example 5 | Liquid cyclooctadiene ring-opened polymer H | Liquid | 2,800 | 4,900 | — | Cyclooctadiene 100 |

|  | Cis/trans ratio | Melt viscosity at 25° C. (Pa · s) | Degree of introduction of terminal hydroxyl groups (%) | Glass transition temperature (° C.) | Melting point (° C.) | State after storage at −30° C. for one week |
|---|---|---|---|---|---|---|
| Example 1 | 18/82 | 7 | 200 | −81 | Not observed | Liquid |
| Example 2 | 17/83 | 2 | 200 | −74 | Not observed | Liquid |
| Example 3 | 17/83 | 146 | 200 | −71 | Not observed | Liquid |
| Comparative Example 1 | 18/82 | 9 | 200 | −92 | 23 | Solid |
| Example 2 | 22/78 | Too viscous to measure | 200 | −63 | Not observed | Solid |
| Comparative Example 3 | 16/84 | Too viscous to measure | 200 | 15 | Not observed | Solid |
| Comparative Example 4 | 37/63 | 12 | 200 | −95 | 18 | Solid |
| Comparative Example 5 | 64/36 | 4 | 180 | −104 | Not observed | Liquid |

TABLE 2

|  |  |  | Example | | | Comparative Example | | | | |
|---|---|---|---|---|---|---|---|---|---|---|
|  |  |  | 1 | 2 | 3 | 1 | 2 | 3 | 4 | 5 |
| Polymer | Liquid cyclopentene ring-opened copolymer A | (Parts) | 100 | — | — | — | — | — | — | — |
|  | Liquid cyclopentene ring-opened copolymer B | (Parts) | — | 100 | — | — | — | — | — | — |
|  | Liquid cyclopentene ring-opened copolymer C | (Parts) | — | — | 100 | — | — | — | — | — |
|  | Liquid cyclopentene ring-opened polymer D | (Parts) | — | — | — | 100 | — | — | — | — |
|  | Cyclopentene ring-opened copolymer E | (Parts) | — | — | — | — | 100 | — | — | — |
|  | Cyclopentene ring-opened copolymer F | (Parts) | — | — | — | — | — | 100 | — | — |
|  | Liquid cyclopentene ring-opened copolymer G | (Parts) | — | — | — | — | — | — | 100 | — |
|  | Liquid cyclooctadiene ring-opened polymer H | (Parts) | — | — | — | — | — | — | — | 100 |
| Polyisocyanate compound | Polymeric MDI | (Parts) | 12 | 12 | 12 | 12 | 12 | 12 | 12 | 12 |
| Cross-linking accelerator | Dibutyltin dilaurate | (Parts) | 0.05 | 0.05 | 0.05 | 0.05 | 0.05 | 0.05 | 0.05 | 0.05 |
| Evaluation esults of cross-linked product | State at ordinary temperature |  | Elastic body | Elastic body | Elastic body | Elastic body | Resin | Resin | Elastic body | Elastic body |
|  | Tensile strength | (MPa) | 4.6 | 4.2 | 4.8 | 3.6 | 1.2 | 5.6 | 2.5 | 1.9 |
|  | Percentage change ΔS in tensile strength before and after heat treatment | (%) | −3 | −3 | −4 | −2 | −5 | −5 | −20 | −25 |
|  | Ozone resistance |  | 1 | 1 | 1 | 1 | 1 | 1 | 2 | 3 |
|  | State after storage at −30° C. for one week |  | Elastic body | Elastic body | Elastic body | Resin | Resin | Resin | Resin | Elastic body |

Table 1 shows a summary of properties of the (co) polymers prepared in Examples 1 to 3 and Comparative Examples 1 to 5, and Table 2 shows a summary of the components and the amounts thereof in the cross-linkable compositions prepared in Examples 1 to 3 and Comparative Examples 1 to 5 and the measurement results of the cross-linked products prepared in these examples.

As shown in Tables 1 and 2, the liquid cyclopentene ring-opened copolymers which had hydroxyl groups at the ends of the copolymer chains, contained 60 to 95 wt % of a monomer unit derived from cyclopentene and a monomer unit derived from the norbornene compound, and had a melt viscosity at 25° C. of less than 500 Pa·s maintained the liquid state after storage at −30° C., which indicates their excellent handling properties at low temperature. Additionally, the cross-linked products obtained using the liquid cyclopentene ring-opened copolymers had high tensile strength and excellent heat resistance (small percentage changes in tensile strength before and after the heat treatment), had excellent ozone resistance, and maintained properties as elastic bodies, which indicates their excellent cold resistance (Examples 1 to 3).

On the other hand, the liquid cyclopentene ring-opened polymer free from a monomer unit derived from the norbornene compound solidified during storage at −30° C., which indicates its poor handling properties at low temperature. Additionally, the cross-linked product prepared using the liquid cyclopentene ring-opened polymer turned into a resin-like product, and could not maintain properties as an elastic body (Comparative Example 1).

The semi-solid cyclopentene ring-opened copolymers, which were too viscous at 25° C. to measure the melt viscosity, solidified during storage at −30° C., which indicates their poor handling properties at low temperature. Additionally, the cross-linked products prepared using the semi-solid cyclopentene ring-opened polymers turned into resin-like products during storage at −30° C., and could not maintain properties as elastic bodies (Comparative Examples 2 and 3). Furthermore, the cross-linked product obtained in Comparative Example 2 had remarkably inferior tensile strength.

The liquid cyclopentene ring-opened copolymer prepared by copolymerization with the cyclooctadiene instead of the norbornene compound solidified during storage at −30° C., which indicates its poor handling properties at low temperature. Additionally, the cross-linked product prepared using the liquid cyclopentene ring-opened polymer had low tensile strength and poor heat resistance (a large percentage change in tensile strength before and after the heat treatment), and had poor ozone resistance. Furthermore, the cross-linked product turned into a resin-like product during storage at −30° C., and could not maintain properties as an elastic body (Comparative Example 4).

The cross-linked product obtained using the liquid cyclooctadiene ring-opened polymer also had remarkably low tensile strength and poor heat resistance (a large percentage change in tensile strength before and after the heat treatment), which indicates its poor ozone resistance (Comparative Example 5).

The invention claimed is:

1. A liquid cyclopentene ring-opened copolymer comprising a monomer unit derived from cyclopentene and a monomer unit derived from a norbornene compound,
   the monomer unit derived from cyclopentene being present in an amount of 60 to 95 wt %,
   the liquid cyclopentene ring-opened copolymer having a hydroxyl group-terminated copolymer chain and having a melt viscosity at 25° C. of less than 500 P·s, which is measured using a B-type viscometer at a shear rate of within the range of 1.2 to 10 sec$^{-1}$.

2. The liquid cyclopentene ring-opened copolymer according to claim 1, which has a number average molecular weight (Mn) of 500 to 20,000.

3. The liquid cyclopentene ring-opened copolymer according to claim 1, wherein the cis/trans ratio of double bonds in repeating units is 10/90 to 40/60.

4. The liquid cyclopentene ring-opened copolymer according to claim 1, which has a glass transition temperature (Tg) of −50° C. or lower.

5. A method for producing the liquid cyclopentene ring-opened copolymer according to claim 1, comprising:
performing ring-opening polymerization of monomers including cyclopentene and the norbornene compound in an ether- or ketone-based solvent as a polymerization solvent using a polymerization catalyst containing a ruthenium compound and a hydroxyl group-containing chain transfer agent.

6. A cross-linkable composition comprising a polyfunctional isocyanate compound in an amount of 1 to 100 parts by weight with respect to 100 parts by weight of the liquid cyclopentene ring-opened copolymer according to claim 1.

7. A cross-linked product obtained by cross-linking the cross-linkable composition according to claim 6.

* * * * *